(12) United States Patent
Fritsche (10) Patent No.: US 8,972,521 B2
(45) Date of Patent: Mar. 3, 2015

(54) METHOD AND DEVICE FOR OPERATING WIND FARM POWER GRIDS WITH IMPROVED DATA TRANSMISSION PROTOCOL

(75) Inventor: Josef Fritsche, Nueziders (AT)

(73) Assignee: Bachmann GmbH, Feldkirch (AT)

( * ) Notice: Subject to any disclaimer, the term of this patent is extended or adjusted under 35 U.S.C. 154(b) by 178 days.

(21) Appl. No.: 13/093,677

(22) Filed: Apr. 25, 2011

(65) Prior Publication Data

US 2012/0102144 A1 Apr. 26, 2012

(30) Foreign Application Priority Data

Apr. 23, 2010 (AT) .................................. A 663/2010

(51) Int. Cl.
*G06F 15/16* (2006.01)
*H04L 29/06* (2006.01)
*H04L 12/42* (2006.01)
*H04L 29/08* (2006.01)
*H04J 3/06* (2006.01)

(52) U.S. Cl.
CPC ................ *H04L 69/26* (2013.01); *H04L 12/42* (2013.01); *H04L 69/32* (2013.01); *H04L 29/08072* (2013.01); *H04L 67/125* (2013.01); *H04J 3/0658* (2013.01)
USPC ............................ 709/217; 709/218; 709/219

(58) Field of Classification Search
CPC ... H04L 69/32; H04L 29/08072; H04L 29/06; H04L 29/0809; H04L 67/125
See application file for complete search history.

(56) References Cited

U.S. PATENT DOCUMENTS

| | | | |
|---|---|---|---|
| 7,298,059 B2 * | 11/2007 | Delmerico et al. ............. 307/85 |
| 7,343,437 B2 | 3/2008 | Kynast et al. | |
| 7,677,869 B2 * | 3/2010 | Martinez De Lizarduy Romo et al. ............................... 416/37 |
| 7,960,850 B2 * | 6/2011 | Rasmussen ..................... 290/44 |
| 8,032,614 B2 * | 10/2011 | Riesberg et al. ............... 709/220 |
| 2004/0032856 A1 | 2/2004 | Sandstrom | |
| 2004/0230377 A1 * | 11/2004 | Ghosh et al. ...................... 702/3 |
| 2006/0058658 A1 | 3/2006 | King et al. | |
| 2007/0255832 A1 * | 11/2007 | Riesberg et al. .............. 709/226 |
| 2009/0204266 A1 * | 8/2009 | Lovmand et al. ............. 700/287 |
| 2009/0254224 A1 * | 10/2009 | Rasmussen ................... 700/287 |

OTHER PUBLICATIONS

Jean-Dominique Decotignie, "The Many Faces of Industrial Ethernet (Past and Present)" IEEE Industrial Electronics Magazine (Mar. 2009) (pp. 8-19).
Jean-Pierre Thomesse, "Fieldbus Technology in Industrial Automation" Proceedings of the IEEE, vol. 93, No. 6 (Jun. 2005) (pp. 1073-1101).
European Search Report, EP11002613, dated Oct. 7, 2011 (13 pages).

* cited by examiner

*Primary Examiner* — Dhairya A Patel
(74) *Attorney, Agent, or Firm* — The Maxham Firm (57) ABSTRACT

A method and apparatus for the operation of a wind farm grid system. Methods and apparatus are provided for networking between the farm management system (farm master) and individual wind turbines (WKA) of a wind farm via a central network for the purpose of data transmission in both directions. The central network may be configured as a ring, star, line, or tree having a physical layer which communicates with a data link layer which is in communication with a wind farm protocol (WPP) application layer through a WPP real-time driver.

22 Claims, 9 Drawing Sheets

MASTER: SYNCHRONUS OPERATION (E.G., IO-SYNC MULTIPLE):

SLAVE: ASYNCHRONOUS OPERATION (DIFFERENT CYCLE TIMES):

| ETHERNET HEADER | | | | TELEGRAM | | | | ETHERNET | |
|---|---|---|---|---|---|---|---|---|---|
| DEST ADDR | SOURCE ADDR | VLAN TAG | TYPE XXXX | PROTOCOL HEADER | BLOCK HEADER +DATA1 | ... | BLOCK HEADER +DATAX | PAD | FCS |
| 6 | 6 | 4 | 2 | 12 | 16+n | 16+m | 16+l | 0..32 | 4 |

FIG. 11

| VLAN TAG | | | |
|---|---|---|---|
| TYPE (0x8100) | | PRIO | VLAN ID |
| 16 | 1 | 3 | 12 |

METHOD AND DEVICE FOR OPERATING WIND FARM POWER GRIDS WITH IMPROVED DATA TRANSMISSION PROTOCOL

FIELD OF THE INVENTION

The invention relates to a method and a device for the operation of wind farm grid systems, in particular a method for networking between the farm management system (which is also referred to as the farm master) and individual wind turbines (WKA) of an individual wind farm via a central network for the purpose of data transmission in both directions which is usually embodied as a ring.

BACKGROUND

In the course of the successive worldwide promotion of regenerative energies, and specifically the intensive use of wind energy, increased demands are being made on the part of the power supply companies (EVU) on the communication of wind farms. Wind farms can be composed of several 100 wind turbines (=slaves), wherein a farm master monitors and controls the wind farm. The farm master thereby has the function of supplying the respective slaves (for example, programmable control) of the individual wind turbines with data at specific time intervals (cycles).

Standard protocols such as real-time Ethernet as well as other Ethernet-based field bus protocols cannot satisfy the increased requirements ((for example, operate 500 wind turbines in a millisecond cycle (typically 5-20 ms depending on the performance of the wind farm management system) and thereby exchange over 100 useful data bytes bi-directionally)).

A structure of a wind farm group grid system is usual in which a computing unit (farm master) is connected to a farm network via signal paths and switches. Parts of a wind farm can thereby comprise sub-networks with respectively up to 50 units of wind turbines, which in turn communicate with one another via a superordinate network. Each wind farm group feeds the data generated by the individual wind turbines from the sub-network via a data coupling module (switch) into the farm network. A plurality of sub-networks can thus connect to the farm network, wherein each sub-network is composed of up to 50 individual wind turbines. However, wind farm group grid systems are also conceivable which form a network without a sub-network with up to 500 wind turbines.

Tests have shown that there have not been any data transmission protocols so far that permit a high-speed communication with the quantity structures and topologies described above. The classic Ethernet with its TCP/IP protocol is not designed for these large data quantities and the required real-time behavior.

It must be taken into account that each wind turbine receives and transmits a data flow of, for example, 100 to 300 bytes in each cycle. An optimal cycle time would hereby be 20 milliseconds or less. The cycle time may be exceeded or fallen below only negligibly (real-time behavior).

The known real-time Ethernet protocols are not suitable either for processing these large data quantities and number of subscribers in the specified cycle time. Moreover, these protocols do not have any way of being operated with security mechanisms such as encryption and authentication, which also eliminates the known real-time Ethernet protocols.

Tests have shown that the standard network protocol is not sufficiently deterministic because the multiple-layer model of the TCP/IP protocol (OSI) composed of 7 layers causes a marked delay of the data transmission, which in the present case with the high demands made, is no longer sufficient for the data transmission. The TCP/IP protocol also has the problem that the data packets cannot be prioritized. A preferred treatment of certain real-time data is therefore not possible.

A layer model of the International Organization for Standardization (OSI) is referred to as an OSI layer model (also OSI reference model: Open Systems Interconnection Reference Model). It was developed as the design basis for communications protocols.

The functions of the communication to this end were divided into seven layers built up one on top of the other. For each layer there is a description that states what this layer has to accomplish. These requirements have to be realized by the communication protocols. The concrete implementation is not stipulated thereby and can therefore be very different. Thus in the meantime numerous protocols of this type exist for each layer.

In the case of the OSI model, there are seven layers with fixed requirements. On each individual layer in each case an instance implements the requirements. The instances on the transmitter and receiver side must operate according to fixed rules so that they agree how the data are to be processed. The establishment of these rules is described in a protocol and forms a logical horizontal connection between two instances of the same layer.

Each instance provides services that can be used by a layer directly above it. To provide the service, an instance itself uses the services of an instance directly below it. The real data flow thus occurs vertically. The instances of a layer can be exchanged precisely when they are exchanged at the transmitter as well as with at the receiver.

The Seven Planes of the Prior Art OSI Layer Model

The degree of abstraction of the functionality decreases from layer 7 through layer 1.

Layer 7—Application Layer

The application layer (also: processing layer) is the topmost of the seven hierarchical layers. It provides the applications with access to the network (for example, for data transmission, e-mail, virtual terminal, remote login, among others). The actual application process lies above the layer and is not handled by the OSI model.

Hardware/software on this layer: Gateway, protocol converter, fax to e-mail services.

Protocols and standards: X.400, X.500, ISO 8571 (FTAM), ISO 9040/9041 (VT), ISO 9506 (MMS), MHS, VTP, FTP, NFS, Telnet, SMTP, HTTP, LDAP, JTM, SSH.

Layer 6—Presentation Layer

The presentation layer (also data presentation layer, data provision plane) converts the system-dependent presentation of the data (for example, ASCII, EBCDIC) into an independent form and thus renders possible the syntactically correct exchange of data between different systems. Also functions such as data compression and encryption belong to layer 6. The presentation layer ensures that data that are transmitted by the application layer of a system can be read by an application layer of a different system. If necessary, the presentation layer acts as a translator between different data formats, in that it uses a data format, the ASN.1 (Abstract Syntax Notation One), which can be understood by both systems.

Protocols and standards: ISO 8822/X.216 (Presentation Service), ISO 8823/X.226 (Connection-Oriented Presentation Protocol), ISO 9576 (Connectionless Presentation Protocol).

Layer 5—Session Layer

Layer 5 (Session Layer, control of logical connections) guarantees the process communication between two systems.

Here, among other things, the RPC (Remote Procedure Call) protocol is found, in order to eliminate session breakdowns and similar problems, the session layer provides services for an organized and synchronized exchange of data. For this purpose reset points, so-called check points, are introduced, at which the session can be synchronized again after the loss of a transport connection without the transmission having to start over again.

Protocols and standards: ISO 8306/X.215 (Session Service), ISO 8327/X.225 (Connection-Oriented Session Protocol), ISO 9548 (Connectionless Session Protocol), RPC (Remote Procedure Call).

Layer 4—Transport Layer

The functions of the transport layer (also: end-to-end control, transport control) include the segmentation of data packets and congestion avoidance. The transport layer provides the application-oriented layers 5-7 with a uniform access so that they do not need to take into account the prosperities of the communications network. Five different service classes of different quality are defined in layer 4 and can be used by the upper layers from the simplest to the most sophisticated service with multiplex mechanisms, error control and error correction methods.

Protocols and standards: ISO 8073/X.224, ISO 8602, TCP, UDP, SCTP.

Layer 3—Network Layer

The network layer (also: packet layer) guarantees with line-oriented services the switching of connections and with packet-oriented services the forwarding of data packets. The data transmission goes in both cases respectively beyond the entire communications network and includes the routing between the network nodes. Since direct communication between the sender and the target is not always possible, packets must be forwarded by nodes that lie on the way. Forwarded packets do not reach the higher layers, but are provided with a new intermediate target and sent to the next node.

The most important functions of the network layer include the establishment and updating of routing tables and the fragmentation of data packets. In addition to the Internet Protocol, the NSAP addresses also belong to this layer. Since a communications network can be composed of several partial networks of different transmission media and protocols, in this layer the implementation functions are also found, which are necessary for forwarding between the partial networks.

Hardware on this layer: router, layer 3 switch (Brouter).

Protocols and standards: X.25, ISO 8208, ISO 8473 (CLNP), ISO 9542 (ESIS), IP, IPsec, ICMP.

Layer 2—Data Link Layer

The object of the data link layer (also: section security layer, data security layer, connection security layer, connection plane, procedure plane) is to ensure a reliable, that is, a largely error-free transmission and to regulate access to transmission medium. The division of the bit data flow into blocks and the addition of sequential numbers and checksums are used for this purpose. Faulty, incorrect, or lost blocks can be requested anew by the receiver by means of acknowledgment and repetition mechanisms. The blocks are also referred to as frames.

A "data flow control" makes it possible for a receiver to dynamically control the speed at which the opposite side may send blocks. The Institute of Electrical and Electronics Engineers, or IEEE, saw the necessity to also regulate collision resolution for a transmission medium for local networks, which is not provided in the OSI model.

According to the IEEE, layer 2 is divided into two sublayers: LLC (Logical Link Control) and MAC (Media Access Control).

Hardware on this layer: bridge, switch (multiport bridge).

The Ethernet protocol describes layer 1 as well as layer 2, wherein on this CSMA/CD is used as access control.

Protocols and standards that are based on other layer 2 protocols and standards: HDLC, SDLC, DDCMP, IEEE 802.2 (LLC), ARP, RARP, STP.

Protocols and standards that are based directly on layer 1: IEEE 802.11 (WLAN), IEEE 802.4 (Token Bus), IEEE 802.5 (Token Ring), FDDI.

Layer 1—Physical Layer

The physical layer is the lowest layer. This layer provides mechanical, electrical, and further functional auxiliaries in order to activate or deactivate physical connections, to maintain them, and to transmit bits via them. This can be, for example, electric signals, optical signals (fiber optics, laser), electromagnetic waves (wireless networks), or sound. The methods used for them are referred to as transmission processes. Devices and network components that are assigned to the physical layer are, for example, the antenna and the amplifier, plug and socket for the network cable, the repeater, the hub, the transceiver, the T connector, and the terminator.

On the physical layer the digital bit transmission is carried out on a line-based or lineless transmission segment. The common use of a transmission medium can take place on this layer by means of static multiplexing or dynamic multiplexing. In addition to the specifications of certain transmission media (for example, copper cable, optical waveguide, electric mains) and the definition of plug connections, this also requires further elements. Moreover, on this plane it must be decided how an individual bit is to be transmitted at all.

This is defined as follows: in currently known computer networks information is usually transmitted in the form of bit sequences. Of course, the values 0 and 1 are unknown to the physical type of transmission itself, for example, voltage pulses in a copper cable in the case of electric transmission, or frequencies and amplitudes of electromagnetic waves in the case of radio transmission. Therefore for each medium a coding of these values must be found, for example, a voltage pulse of a specific level or a radio wave with a specific frequency, in each case based on a specific duration. These aspects must be precisely defined for a specific network. This takes place with the aid of the specification of the physical layer of a network.

Hardware on this layer: modem, hub, repeater.

Protocol and standards: V.24, V.28, X.21, RS 232, RS 422, RS 423, RS 499.

The network protocols developed according to the OSI reference model have in common with the TCP/IP protocol family that these are hierarchical models. However, there are minor conceptional differences. OSI establishes the services precisely, which each layer has to provide for the layer above it. TCP/IP does not have the same kind of strict layer concept as OSI. The functions of the layers are not precisely established, nor are the services. It is permitted for a lower layer, going around interim layers, to be used directly by a higher layer. TCP/IP is thus considerably more efficient than the OSI protocols. The disadvantage of TCP/IP is that there is an individual network protocol in each case for many small and micro services. In contrast, OSI has established a large scope of services, which has many options, in each case, for its protocols. Not every OSI software commercially available has the full scope of services implemented. Therefore OSI profiles were defined, each of which contain only one specific set of options. OSI software from different manufacturers works together when the same profiles are implemented.

However, the OSI layer model is not the only reason why TCP/IP is not suitable for a real-time transmission. TCP/IP uses only the lower 4 layers. It is rather the fact that all network stacks, regardless of whether they are TCP/IP or real-time Ethernet protocols, require a large CPU capacity for the communication required in this application or do not have sufficient real-time behavior. Another reason for the lack of real-time capability of TCP/IP is the lack of prioritization of the data packets (VLAN tag) and the associated mixing of slow and high-speed communication.

SUMMARY OF EMBODIMENTS OF THE INVENTION

Initial Situation to be Addressed

Farm regulation and management is required in some form in every wind farm. Hitherto communication has been covered by the manufacturer in each case with his own developments. These are application-type implementations (socket communication as part of the operation management program of the wind turbine). This type of communication has its limits. In order to meet the requirements of today in large wind farms, a new data transmission embedded deep in the system software is necessary for high-speed data transmission.

A communication protocol is to be provided which meets today's requirements for farm regulation and management as M2M (machine-to-machine) communications. The communication is carried out in data packets of a specific size from the farm master to the individual slaves (wind tower) in both directions. The configuration and the link to the application should be kept as simple as possible.

At the farm master a driver as the master and in the wind tower a driver as the slave is necessary. A controller must be able to be the master and slave at the same time.

Requirements

Extensive studies with the Standard Protocol Profinet RT (a widespread real-time Ethernet protocol) have shown that although Profinet RT is suitable in principle, in larger farms (over 50 subscribers) the CPU load on the farm server exceeds the tolerable limit. Other Ethernet-based field bus protocols cannot meet the requirements either. Special features according to embodiments of the invention in the farm regulation are:

Packet orientation, over 100 useful data bytes bidirectionally
Number of slaves (wind turbines) with up to 500 subscribers
Expansion of the wind farm over several subnets with switches and network segments, if these broadcasts can be transmitted
Cycle time of just a few milliseconds
Normal TCP/IP communication in addition to real-time communication
Simple startup (as little as possible to no configuration)
All subscribers must be connectable and disconnectable online
Optional security mechanisms such as authentication and encryption
Segmentation of parts of a wind farm to form independent networks (virtual local networks) via the IEEE 802.1Q VLAN technology
Network transmission redundancy must be optionally possible
The use of commercially available network components (switches, cabling, among others) and Ethernet technology (Ethernet controller in the terminals) must be possible.

Product Implementation

It must be possible to implement the wind farm protocol according to embodiments of the invention in every wind farm that is equipped with suitable controls and has a serviceable network. Initially, fixed networked components with transmission lines in the range of 100/1000 Mbit are taken as a basis.

A purpose of embodiments of the present invention is to provide a protocol for networking a multiplicity of wind tower groups (subnet) with the farm master via a central farm network so that the quantity structures of, for example, up to 500 wind turbines (WKA) can be regulated with a cycle time of just a few milliseconds via a farm management system.

Aspects of embodiments of the present invention are set forth below:

Communication

In order to meet the real-time requirements, the communication is necessary directly on the data link layer. The connection setup and the acyclic communication, however, can be carried out via TCP/IP.

Wind Farm Protocol (WPP)

The term "wind farm protocol" is used herein for the data transmission protocol according to all aspects of the invention.

With the disclosed embodiments of the present invention it is now possible, among other things, to meet the following requirements:

Packet orientation over 100 useful data bytes bidirectionally per cycle
Number of slaves with up to 500 subscribers
Extension of the wind farm over several switches and logical or physical network segments if these broadcasts can be transmitted
Cycle time of a few milliseconds for all subscribers
Normal TCP/IP communication in addition to the real-time communication
Simple startup (as little as possible configuration to none at all)
Use of security mechanisms such as authentication and encryption
Segmentation of parts of a wind farm to form independent networks (virtual local networks) via the IEEE 802.1Q VLAN technology
Use of commercially available network components (switches, cabling, among others) and Ethernet technology (Ethernet controller in the terminals).

Previous protocols have been object-oriented or application-oriented implementations, which have very extensive packet lengths. The new type of wind farm protocol is "slim" with respect to the data length and established on layer 2 in the ISO/OSI 7 layer model.

Based on the following description, an example of a connection setup according to embodiments of the invention is described below.

Connection Setup

Possible Slave States:

| State | Description |
| --- | --- |
| INIT | No communication is taking place. In this state the slave can be parametricized. |
| READY | The synchronization (sync packets) is started, the slave address resolution and the connection setup are carried out. |
| INIT | The slave is being configured by the master |

-continued

| State | Description |
|---|---|
| RUN | The cyclic data exchange is active |
| OFFLINE | The connection to the master has been interrupted |
| ERROR | The slave is in error state (for example, invalid configuration) |

During connection setup, the master carries out the following steps:
1. Find slave via name or IP address and MAC address
   →own protocol
2. Exchange and verify configuration data
   Cycle time, data length, synchronization, timeouts . . . .
   (this step can be skipped in the case of a reconnect)
   →own protocol
3. Start synchronization
   →PTP or sync packet
4. Set slave in RUN state
   →cyclic data exchange.

Addressing ("ARP")

Addressing of a slave takes place via a configurable slave name or directly via the IP address. The address resolution is carried out by means of an Ethernet broadcast.

During the connection set up, the master assigns each slave a unique slave ID, which is subsequently used for addressing the slaves. This is necessary in particular for the cascading.

Slave Search Possibilities
1. The master sends a broadcast to which all of the slaves respond (the broadcast sync packets can be used for this purpose).
   The master also receives (unnecessary) responses from slaves, which are of no interest (due to the restriction to a SegmentCode this should not be a problem).
   In addition, the search can be restricted to one slave status (for example, READY or OFFLINE).
   Slaves can address the master directly.
This method is suitable in the initialization and is necessary when the slaves are unknown (that is, search all of the slaves in one segment) or for the bus scan.
2. The master sends a broadcast with the slave address(es).
   Possibly several broadcasts if many slaves are offline.
   Several slaves can be packed in one broadcast: for example, 38 slaves with a slave name of 20 characters (1400B/36B).
   Slaves can address the master directly.
This method is suitable in the initialization and when an application adds slaves to the run time (first search).
3. The master sends a unicast.
   No broadcasts in use.
   Slave MAC address must be known.
   Device replacement is not recognized!
This method is suitable for correcting brief connection breakdowns very quickly. The master further sends a reconnect packet (or data packet) in each cycle. The network capacity utilization thus remains at the level as in operative condition.

Synchronization

The synchronization of all the subscribers must be optionally possible. Ideally, the two following mechanisms can be selected:
1. PTP (IEEE1588)
   The PTP slave regulates the tick source and thus provides the PTP master time to all applications: clock_gettime (0x10,&tp).
   Very high precision.
   With the use of standard switches without a boundary clock function, the run time of the PTP packets fluctuates depending on the network capacity utilization. If the run times fluctuate more than ±50 µs, a brief breakdown of the synchronization can occur.
2. Sync Packets (Broadcasts)
   The master sends a broadcast to all of the slaves cyclically.
   Sufficient precision.
   With the failure of a sync packet, it must give its failure mechanism (local timer).
   Possibly several sync packets in succession in order to cover a packet loss.

Regardless of the application, the WPP does not send the output data until the next protocol cycle or provides the input data to the application.

In order to ensure the data consistency, all of the input and output data are kept in duplicate.

With the receipt of a packet, this is always copied into the backup buffer and is not evaluated by the application until the next cycle. The buffer change takes place at the start of the cycle.

With the transmission, the packet is sent from the backup buffer while the application writes new values in the current buffer. The buffer change takes place at the start of the cycle.

Properties of the Ethernet communication according to embodiments of the invention:
   No TCP/IP stack (no sockets).
   Simple and independent (only one transport layer).
   Communication in the entire broadcast domain (no subnetworks).
   Login and user administration not absolutely necessary.
   Security mechanisms are optionally possible and provided (login, authentication and SSL encryption).
   Prioritization of the real-time packets with respect to TCP/IP.
   Simultaneous standard TCP/IP communication without influencing the real-time behavior.
   Multicast addressing possible.
   Standard network technology (switches, wiring) and standard Ethernet controller with the terminals (master and slave) can be used.

BRIEF DESCRIPTION OF THE DRAWING

Advantages, features, and purposes of the invention will be readily perceived from the following detailed description, when read in conjunction with the accompanying drawing, wherein.

DETAILED DESCRIPTION OF EMBODIMENTS OF THE INVENTION

Figure 1:
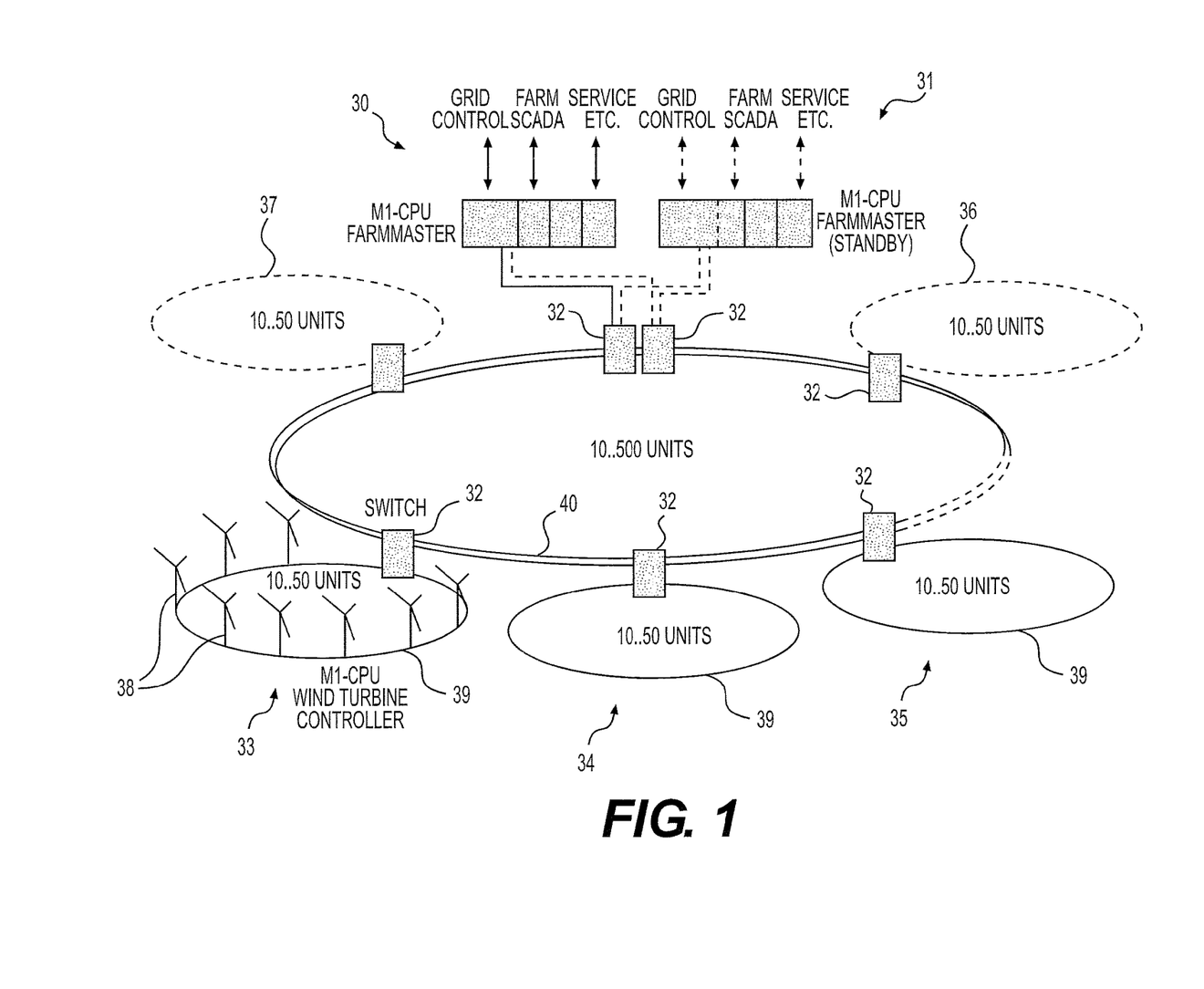
FIG. 1 diagrammatically shows a data transmission network in the form of a ring line for connection of a multiplicity of wind tower groups in accordance with an embodiment of the invention.

FIG. 1 shows a farm master 30, to which optionally further farm masters 31, among others, can be connected in parallel. The existing CPU is composed of modules, which are later explained as grid control, farm scada and service. Via signal paths and data paths acting bi-directionally, farm master 30, 31 is connected to the respectively assigned coupling module 32, which produces the connection to central ring line 40. In the ring line, corresponding to the number of connected wind farm units 33-37, an identical number of coupling modules 32 is present. Each wind farm group 33-37 has its own central farm ring line 39, to which individual wind turbines 38 are connected via coupling units (not shown). The important factor is that the wind farm protocol (WPP 50) according to this embodiment of the invention with the new WPP real-time driver 49 carries out the data traffic on central ring line 40 as well as on farm ring line 39 and the data traffic between wind turbines 38 and farm ring line 39. WPP 50 and WPP real-time driver are not shown in FIG. 1.

Figure 2:
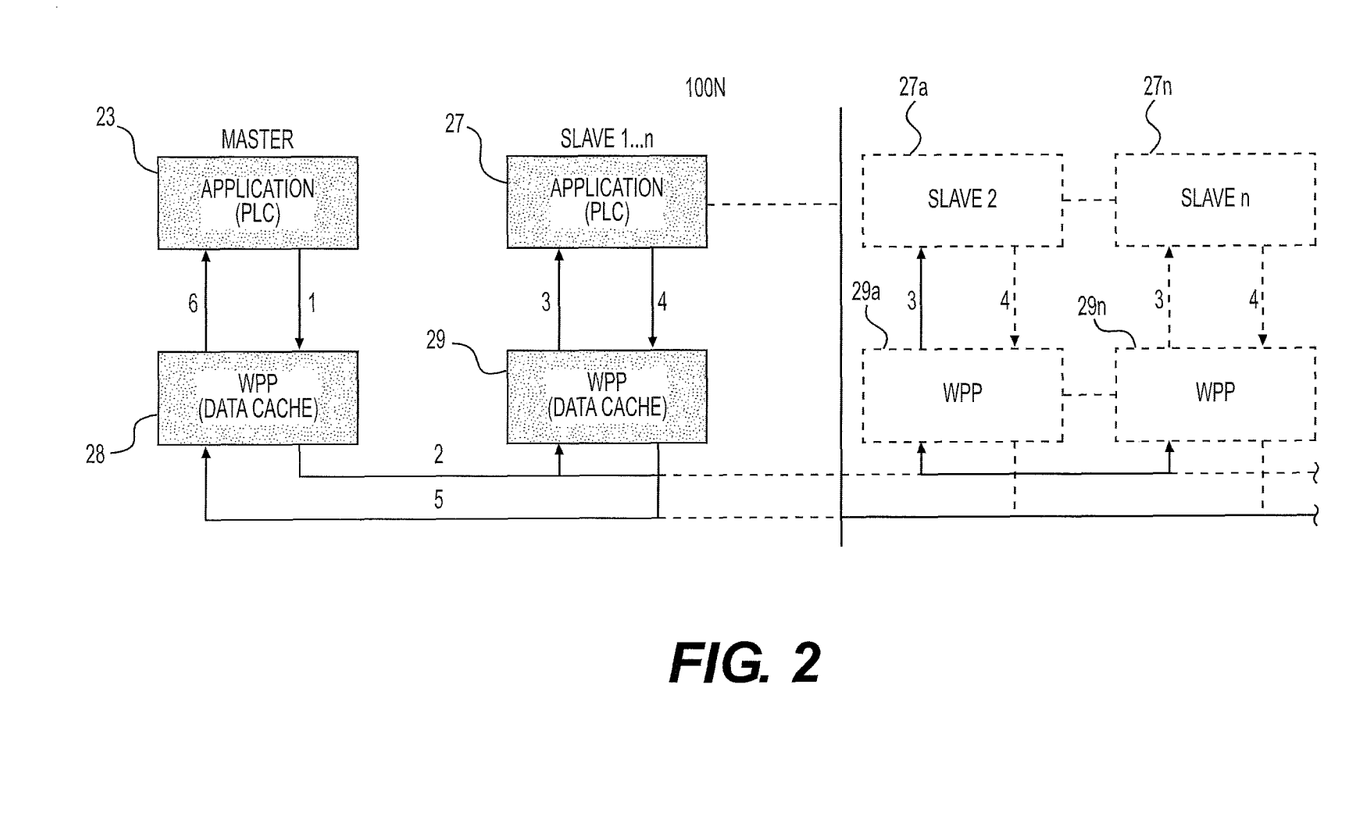
FIG. 2 is a data model of an embodiment of the invention.

FIG. 2 shows the data model according to an embodiment of the invention. Master application 23 is arranged in the farm master. Slave applications 27 are arranged in wind turbines 38. WPP data cache (master) 28 is assigned to master application 23, while WPP data cache (slave) 29 is assigned to slave application 27.

Step 1: Master application 23 writes the output data (into WPP data cache 28).

Step 2: WPP 28 sends the output data to the slave (there to WPP 29) in the next cycle.

Step 3: Slave application 27 reads the input data (from WPP data cache 29).

Step 4: Slave application 27 writes the output data (in WPP data cache 29).

Step 5: WPP 29 sends the output data to the master (there to WPP 28) in the next cycle.

Step 6: Master application 23 reads the input data (from WPP data cache 28).

FIG. 2 shows that a multiplicity of slave applications 27a through 27n are connected in parallel. The data traffic takes place with these further slave applications 27a-27n.

Figure 3:
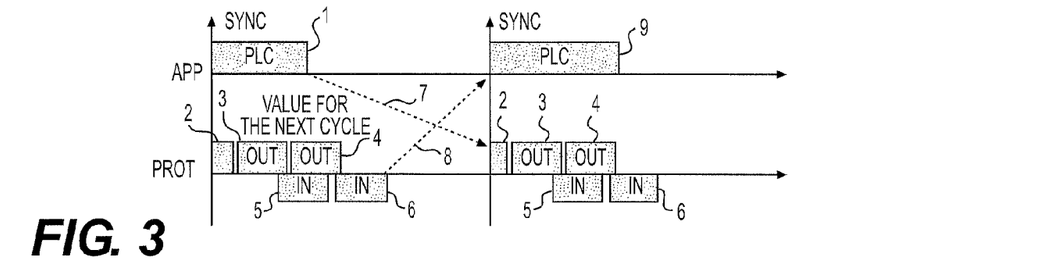
FIG. 3 is a flow diagram with synchronous operation in the master of FIG. 2.

Slave applications 27, 27a-n operate in two different operating modes:

Slave 27: Synchronous Operation:

Based on FIG. 3, slave applications 27, 27a-n are plotted on the ordinate, and underneath the protocol PROT. A slave application 27, 27a-n generates data according to block 1 at the same time the protocol runs with its service to send data, wherein at 2 a start command (sync signal) is given to all wind towers. At 3 a data packet is sent to a wind tower and 4 represents another data packet, which is sent to another wind tower.

At the same time at 5, the input data packet comes from one of these towers and thereafter at 6 an input data packet likewise follows from the other wind tower. The data produced by the application are taken over during the next cycle via the direction arrow 7, as is shown on the right in FIG. 3, namely as output data. The wind towers then receive the data, which the application has compiled in block 1. These data are then distributed to the individual wind towers in turn in the form of data packets, wherein, for example, the one wind tower gets data packet 3 and the other wind tower gets data packet 4.

Likewise, a receipt of input data packets and data packets 5 and 6 by other wind towers occurs in turn.

What was received as input (on the left in FIG. 3) is given to the application via direction arrow 8, which processes these data therefrom and keeps them as block 9, namely for sending in the same manner as described based on FIG. 3 on the left.

The transmission cycle with block 9 thus corresponds to the cycle with block 1.

Figure 4:
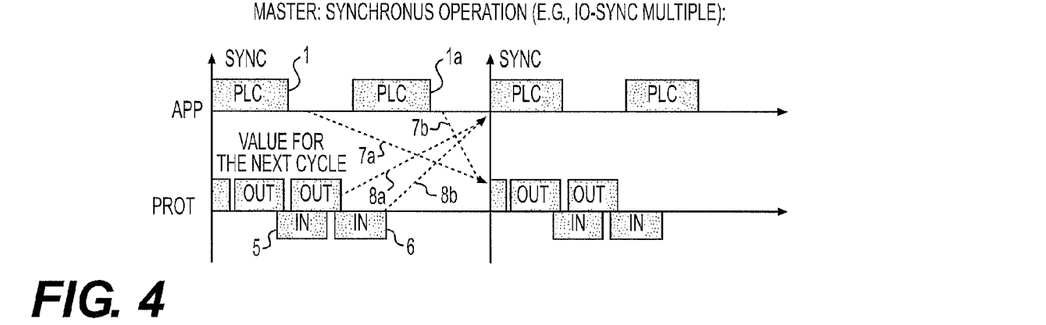
FIG. 4 is a flow diagram with synchronous operation in the master of FIG. 2 with a cycle multiple.

FIG. 4 contains the same explanations as FIG. 3, only that it is discernible that when several applications produce data packets 1, 1a, then likewise a corresponding transmission of these data according to direction arrows 7a, 7b takes place, and conversely also with regard to input data 5, 6 optionally a correspondingly bisected transmission with direction arrows 8a, 8b also takes place.

Figure 5:
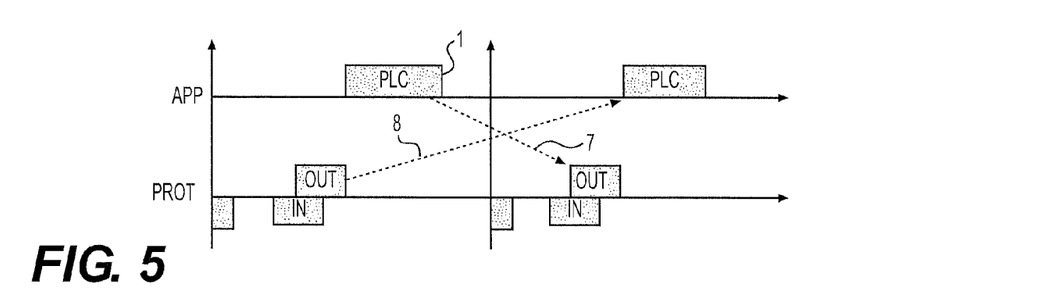
FIG. 5 is a flow diagram of the slave with asynchronous operation of FIG. 2.

Slave 27: Asynchronous Operation:

FIG. 5 shows that when the application generates a block 1, which runs asynchronously to the protocol layer, then in the next possible cycle the data are respectively taken over as shown by direction arrows 7 and 8.

Figure 6:
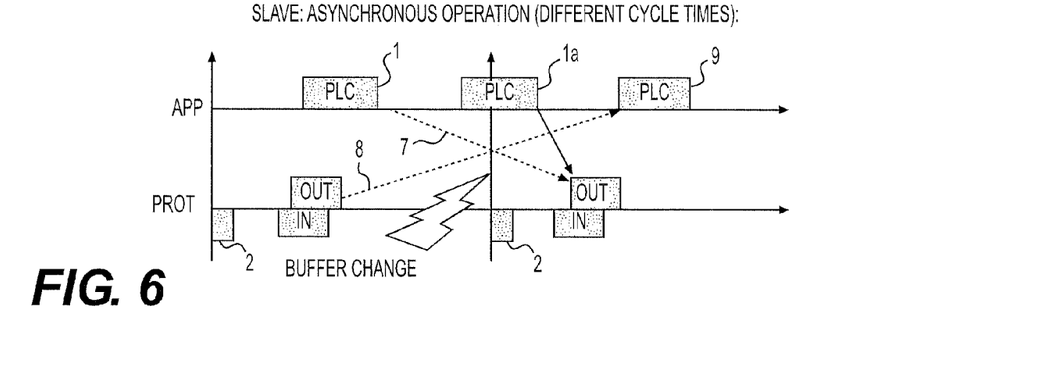
FIG. 6 is a flow diagram of the slave in asynchronous operation of FIG. 2 with different cycle times.

FIG. 6 shows an extreme case where at the start of a cycle an application generates a data block and in this case the collision of data blocks must be avoided. FIG. 6 therefore shows that a copying over a buffer content is necessary, because synchronizing signal 2 now lies centrally to data block 1a and therefore the content of the data block is discarded as A and postponed to another cycle time.

Figure 7:
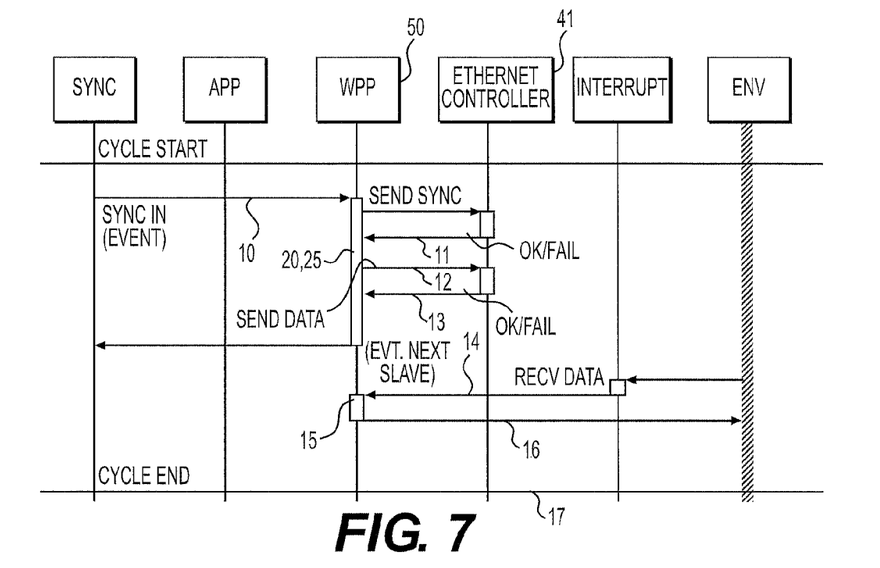
FIG. 7 is an event model with the sequence of the cyclic data exchange in the master with the example of a single slave.

Master 23:

FIG. 7 shows diagrammatically the sequence of the cyclic data exchange by the example of a single slave 27, 27a-n. WPP 50 transmits and receives all of the slave data that are deposited in an internal cache 28, 29.

Figure 8:
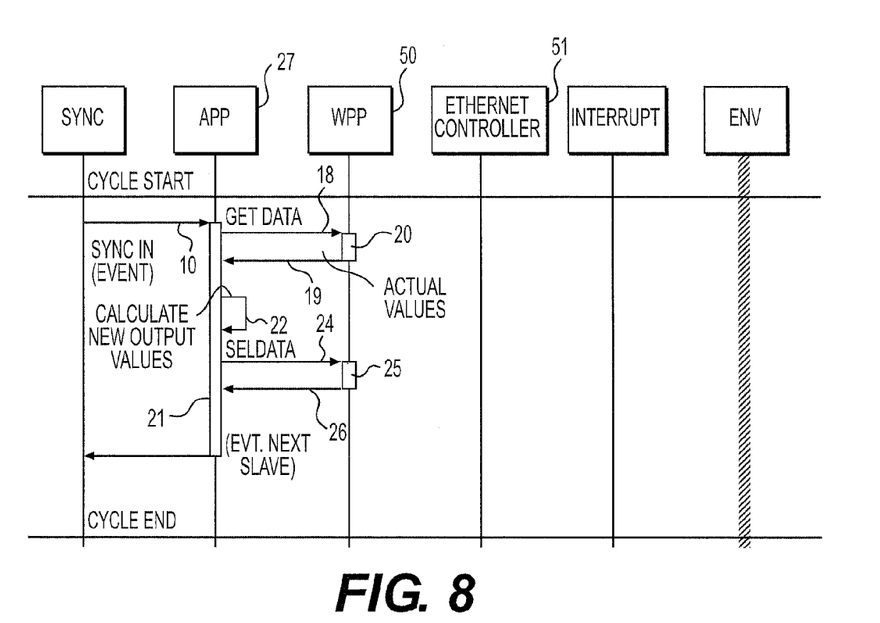
FIG. 8 is an event model with the sequence of the cyclic application program (PLC) in the master with the example of a single slave.

FIG. 8 shows diagrammatically the sequence of a cyclic application program (PLC) in the master by the example of a single slave. WPP 50 stores the application data in an internal cache.

The IO-SYNC (cyclical interrupt in the control CPU) triggers the application as well as WPP 50. It can thus be ensured that the jitter of application and WPP 50 within a cycle do not add up. Depending on the priority, the corresponding "program" is carried out.

Figure 9:
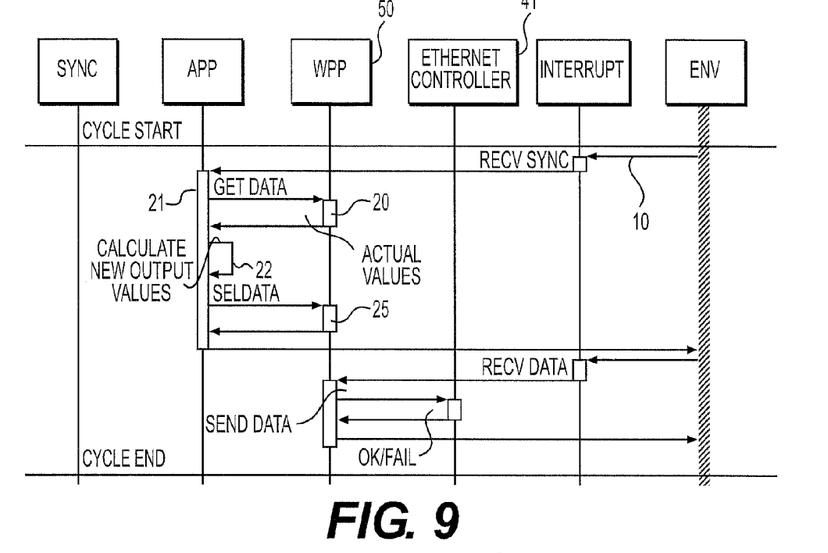
FIG. 9 shows an event program in which the slave application with synchronous operation is triggered by an event mechanism.

Slave 27:

In the case of synchronous operation, slave application 27, 27a-n is triggered by an event mechanism on the basis of the sync packet from master 23. The IO-SYNC is not possible, since this would have to be regulated.

Directly after receipt of the input data, the output data are sent.

FIG. 7 shows the chronological association of the individual modules, namely in the sync module IO-SYNC, in the application module APP, in the protocol module WPP 50, in the Ethernet controller 41, in the interrupt module, and the event module ENV, which triggers in order to synchronize other events.

In each case the time axis under the individual modules is seen as a vertical line and with the first line 10 the sync packet is transmitted and therewith protocol module WPP 50 is triggered. This now sends a command "send sync" via Ethernet Controller 41 and the controller responds with a corresponding signal on WPP 50 and this in turn is triggered by signal 11 and sends signal 12 to Ethernet controller 41, wherein the data are now transmitted, as is discernible by the arrow at signal 12.

When Ethernet controller 41 has finished, it sends a signal 13 with which the data transmission is disconnected or terminated.

In wind farm protocol WPP 50 the received data are evaluated via signal path 14, when evaluation 15 has been completed, a signal 16 is generated to evaluate a cycle termination to event module ENV.

The cycle is thus ended, namely at the line 17 and, if necessary, a new cycle can then begin.

FIG. 8 now shows the chronological course in the application layer (application module APP). In turn, via a signal 10 from the sync unit IO-SYNC, application module APP 27 is triggered with the command to receive data via command 18 (GetData) from WPP protocol 50. The data are removed from block 20 and read into data block 21 via signal path 19.

A control cycle of the application APP (control cycle 22) is contained in data block 21, and the data in data block 21 are accordingly processed with action by the application APP.

The data are transferred to WPP protocol 25 as data packet 50 via signal path 24 and, with successful storage, signaled via signal 26 to the APP.

FIGS. 7 and 8 thus show two different layers or sequences of the layer model according to an embodiment of the invention.

FIG. 9 shows the same sequence that was illustrated based on FIG. 7 for a slave, wherein the same sequences are provided with the same numbers.

The above description therefore applies.

In this case, a signal is generated on line 10 by the wind tower via the module, and the interrupt module is notified, after which this feeds data to data block 21 of WPP 50.

Data are thus received in the slave unit, then the slave processes in the application module the data in data block 21 with control cycle 22 and sends the prepared data in the next cycle in turn as data fragments back to WPP module 50.

Figure 10:
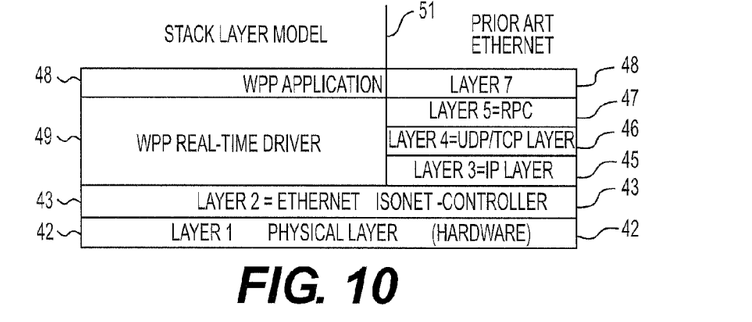
FIG. 10 is a stack layer model of an embodiment of the invention (on the left) compared to an OSI layer model according to the prior art (on the right)

FIG. 10 now shows the layer model according to an embodiment of the invention, where it is discernible that layer components 42 through 48 are present on the right (the prior art is shown to the right of separation line 51). Based on hardware layer 42 (layer 1 of the OSI model), Ethernet control layer 43 (isonet controller) connects as layer 2 of the OSI model. Above it, IP layer 45 (layer 3 in the OSI model) connects. Above that, UDP/TCP layer 46 lies as layer 4 of the OSI model. Above that, RPC layer 47 lies as layer 5 of the OSI model. Above that, WPP application layer 48 lies either as the master application 23 or as the slave application 27.

According to an embodiment of the invention (on the left in FIG. 10) at least the layers 45, 46, and 47 (that is, the layers 3, 4, and 5 of the OSI model) are now dropped and a WPP real-time driver 49 bridges layers 3, 4, and 5 of the OSI layer model. WPP 50 is accordingly composed only of the four layers 42, 43, 49, and 48, that is, the layers 1, 2 of the OSI model and a WPP real-time driver 49 bridging the layers 3, 4, and 5.

According to an embodiment of the invention, the WPP protocol thus differs from the known Ethernet protocols by the discontinuation of the layers RPC, UDP/TCP and IP in the OSI model.

This is where an advantage of the present invention lies, since through the discontinuation of these three layers 45, 46, 47, WPP protocol 50 acts much more quickly, is real-time capable and deterministic, and can serve more subscribers. In addition, there is the possibility of using network security mechanisms and standard network components (switches, wiring, among others). This has hitherto been unknown in the prior art.

Figure 11:
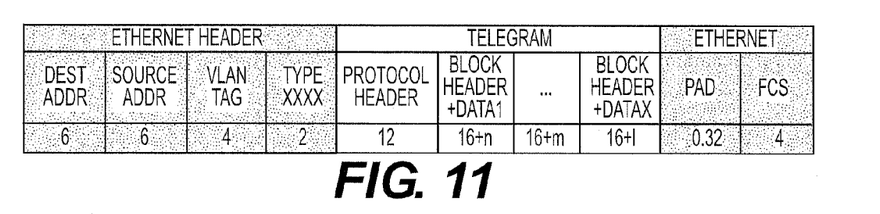
FIG. 11 shows structure of an Ethernet frame according to an embodiment of the invention.

FIG. 11 shows the structure of a packet according to the invention, where the gray or shaded parts belong to the usual Ethernet protocol and the non-shaded parts are parts according to the invention of the new WPP protocol.

The important factor here is that through the discontinuation of the above-mentioned three layers (see FIG. 10), a telegram is now generated that is composed of a protocol and one or more data blocks, such as it has not hitherto been possible to derive from the prior art in this simplicity.

Ethernet Frame

Due to the cascading (and the slave search), several data packets per telegram are necessary. If all of the slaves do not fit in one telegram, several telegrams are transmitted in direct succession. This is shown by FIG. 11.

Figure 12:
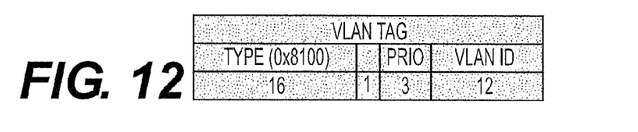
FIG. 12 is a representation of a VLAN tag used with the FIG. 1 embodiment.

The Ethernet frame contains a VLAN tag for prioritizing the real-time packets, see FIG. 12.

The wind protocol can use different priorities for the cyclic real-time communication and the acyclic control commands. In order to avoid errors with foreign packets, an individual WPP protocol type is used.

General protocol-specific information is contained in the protocol header:
Protocol version
Flags (call/reply, further frames, redundancy, gateway, diagnosis . . . )
Format (encryption, endlan . . . )
Number of data packets
Group or segment code
Authentication code (flavor+Len), firstly always 0
The block header contains slave-specific information:
Slave ID (0 or −1 addresses all for, example, sync packets)
Transaction ID (cycle counter, assignment reply to call)
Command (connect, cyclic, read, write, sync, search . . . )
Slave status (run, stop, error . . . )
Flags (block valid/empty, further frames . . . )
Time stamp (time at which the application specifies data; PTP clock)
Length of the data block
Fragment offset, firstly always 0
After the block header come the data:
Data→alignment!

In this WPP version, a slave instance is limited to 1400 bytes of data. The fragment offset (in the block header) provides a fragmentation of the slave data as a future expansion.

With additional commands (in the block header), an acyclic communication can be easily realized. The arguments, data and error codes are incorporated in the data area. In future different equipment profiles can thereby also be implemented.

The MTU (Maximum Transmission Unit) is fixed at 1518 bytes in Ethernet II. In the gigabit Ethernet it can be expedient to use so-called jumbo frames (>1518 bytes) in order to minimize the protocol overhead and the CPU load. However, since there is no standard for packets of this type, it must be tested whether all of the network elements can operate with jumbo frames. Theoretically packets up to 64 k (IPv4 limit) are possible. In practice a size of up to 12,000 bytes is useful, since after that the CRC calculation is no longer efficient.

Jumbo frames are useful in particular for cascading. They are therefore taken into consideration in the WPP.

It is worth emphasizing that, according to FIG. 10, certain layers of the Ethernet protocol were now omitted and instead a direct transmission between the remaining layers takes place. Here the invention stands out compared to the known other networks, since with other networks such as, for example, Profinet and Powerlink, complex layers instead of the omitted layers according to the WPP protocol are respectively provided, which in turn is associated with the disadvantage that the data traffic between the different layers is complex and the advantages of the present invention and the new WPP are therefore not achieved.

Slave/Master Principle in Cascading

Figures 13, 14:
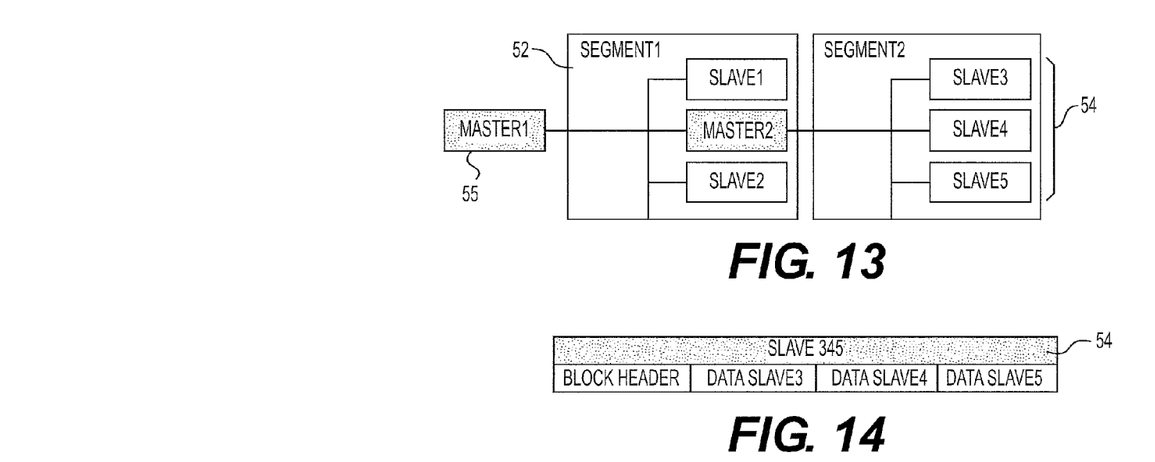
FIG. 13 is a representation of the slave master principle with cascading of the FIG. 1 embodiment.
FIG. 14 is a representation of the slave instance in an Ethernet frame with cascading of the FIG. 1 embodiment.

With reference to FIG. 13, Master2 connects as usual to slaves 3-5 (54). In addition, Master2 provides a slave that communicates with the Master1. The application (52) is the link between master and slave and has to copy all of the data and evaluate status transitions.

All of the data are combined in a slave instance 54. The slave instance must fit in one Ethernet frame!

FIG. 14 shows the arrangement in the Ethernet frame.

Master1 (55) now sees only one slave!

Through the additional application (on Master2) all of the data packets arrive at the destination device delayed by one cycle!

→Poss. coupling via fixed delay (delay application);

→or send data immediately after conclusion of application (within cycle).

Master1 has no direct access to slaves 3-5.

The synchronization is ensured over the entire network

The distinction between the two masters in one network is carried out by the segment code.

Figure 15:
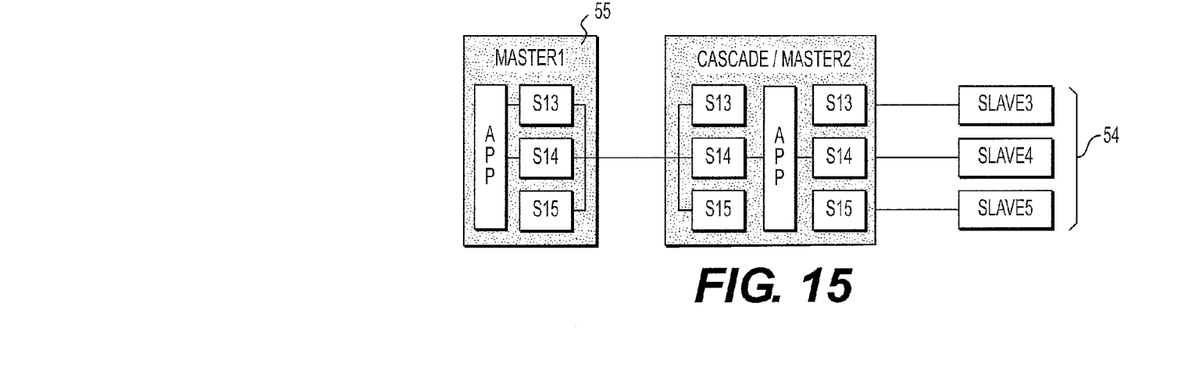
FIG. 15 is a representation of the slave master principle in which each master can communicate with the other master with cascading.

FIG. 15 shows the master/master principle in a cascade arrangement.

Each master can communicate directly with another master, that is, Master1 can connect to slaves 3-5 in Master2. The address parameters (IP, name) are taken over by the slave.

Master1 must calculate the number of possible slaves in the Ethernet frame (input and output data).

Master2 must first establish a connection to slaves 3-5. Only then are all address parameters present.

The cascade reflects all of the slaves, that is, respectively two instances of a slave are applied. This is necessary for reciprocal communication. In turn, the application has to copy all of the data and evaluate status transitions. The additional function GetGatewaySlave( ) provides a handle on a "reflected" slave (on the left). Or the existing function GetSlave( ) with special address parameter (for example, "gateway:MySlave").

Alternatively, a direct forwarding of status information and data is also possible.

Synchronization is ensured over the entire network.

The slaves in Master2 must be assigned to the segment of Master1.

The following functions are for the Master and Slave application!

The connection to the application is on a packet basis. Only the application knows the content. The exchange of data is carried out via a copying process (no pointer transfer).

Figure 16:
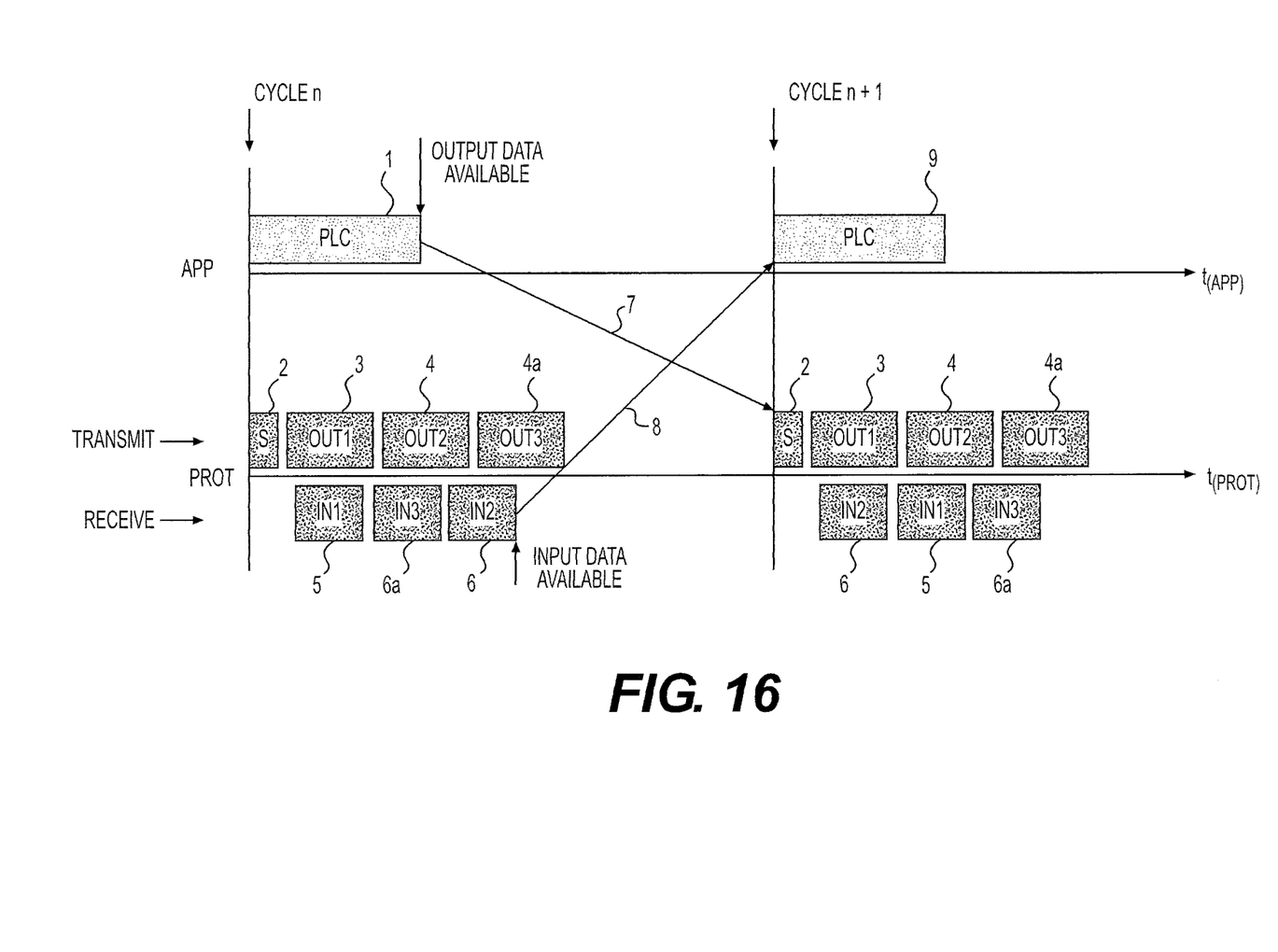
FIG. 16 shows a sequence in the wind farm protocol master with synchronous operation in accordance with an embodiment of the invention.

The individual modules that have been mentioned above illustrated in the drawings, are explained below:

FIG. 16 discloses the sequence in the Master wind farm protocol with synchronous operation as follows:

In this figure two time axes t(APP) and t(PROT) are shown horizontally, one for the application software (APP) and one for the wind farm protocol (PROT). Two cycles are marked in the Master with the designation "n" and "n+1"; the start of each cycle is a perpendicular line. With synchronous operation, the application and the protocol start the program run simultaneously.

The application program, designated as PLC (either 1 or 9) calculates all of the output data and transfers them at the end of the run to the protocol layer for forwarding to all of the slaves. This is indicated by arrow 7 downward from PLC to S (2).

In the wind farm protocol (PROT axis) everything that is entered above the time axis t(PROT) is transmitted and everything that is below the time axis t(PROT) is received. At the start of the cycle a special sync packet is sent by the master for all slaves via a multicast or broadcast, which is the block with the designation "S" (2). This sync packet is received by all slaves as it were simultaneously. Thereafter per slave the output data are transmitted consecutively, shown by the blocks with the designation Out1, Out2 and Out3 for 3 subscribers (3, 4, and 4*a*). At the same time, immediately after receipt of the sync packet, the input data are sent by each slave to the master, represented by the blocks with the designation In1, In2, and In3 (5, 6, and 6*a*). The input data can arrive in any order. As soon as all of the input data have arrived, they can be retrieved by the application software. This occurs at the start of cycle "n+1" indicated by arrow 8 upward from 6 (In2) to 9 (PLC).

In the following cycle the entire process is repeated as described above.

Figure 17:
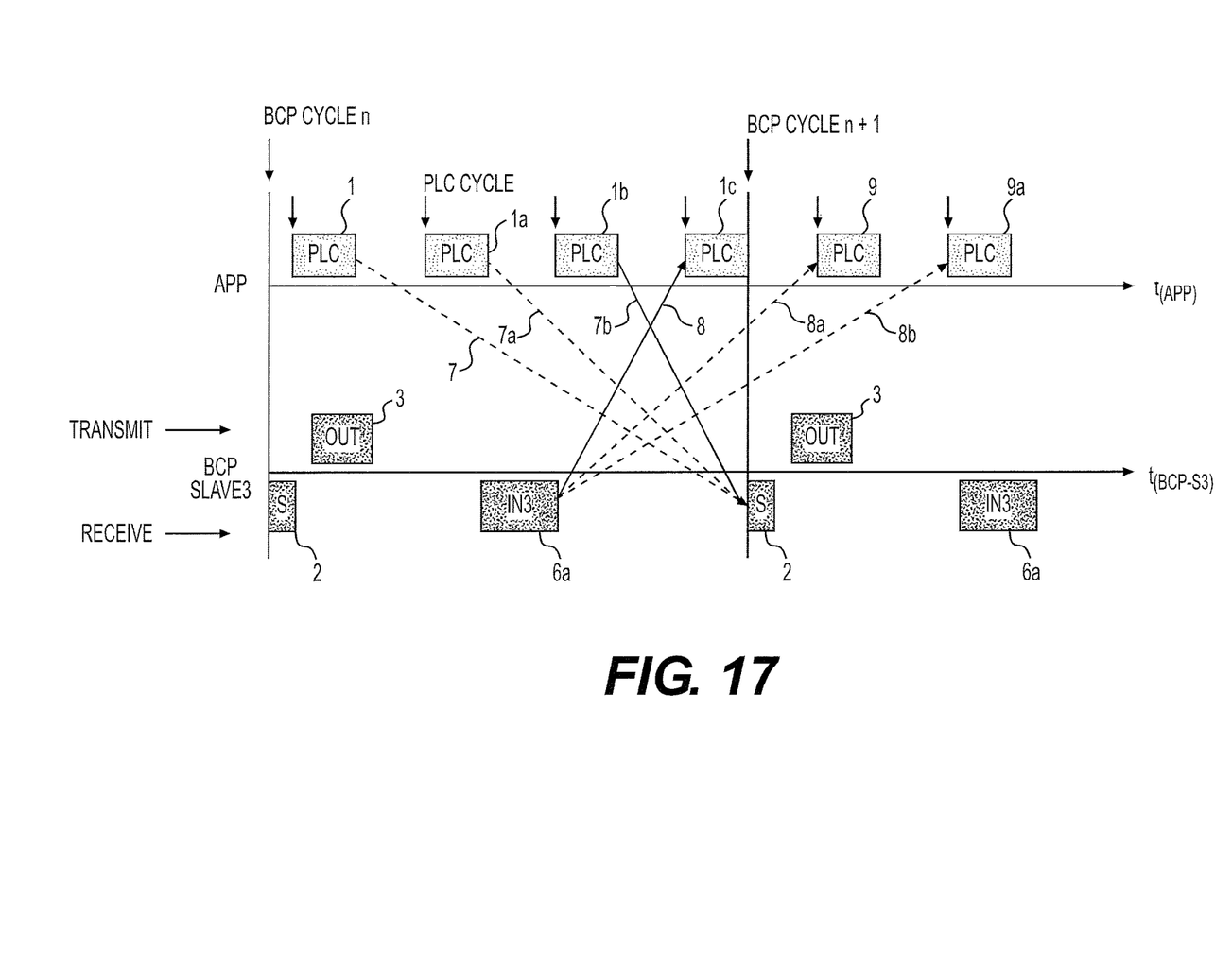
FIG. 17 shows a sequence in the wind farm protocol slave with asynchronous operation in accordance with an embodiment of the invention.

FIG. 17 discloses the sequence in the slave wind farm protocol with asynchronous operation as follows:

In this figure, two time axes t(APP) and t(BCP-S3) are shown horizontally, one for the application software (APP) and one for the wind farm protocol (BCP Slave3). Two cycles with the designation "n" and "n+1" are indicated; the start of each cycle is a perpendicular line. In asynchronous operation, the application and the protocol do not start the program run simultaneously; both sequences have their own non-synchronous cycle timer (BCP cycle and PLC cycle).

The application program in the slave, designated as PLC (1, 1*a*, 1*b*, and 1*c*) calculates the output data of the slave and transfers them at the end of the run to the protocol layer for forwarding to the master. The protocol layer forwards these data only in the next BCP cycle to the master. The slave output data are thus overwritten until the next BCP cycle starts. This is indicated by the dashed arrows 7, 7*a*, 7*b* downward from "PLC" to "S."

In the wind farm protocol (BCP Slave3 axis) everything plotted above the time axis t(BCP-S3) is transmitted and everything below the time axis t(BCP-S3) is received. The cycle starts with the receipt of the sync packet "S" (2) from the master. Thereafter the output data are sent from the slave to the master, shown by the block with the designation Out (3).

The last transferred data are transmitted. This is indicated by the solid arrow 7*b* downward from "PLC" 1*b* to "S" 2.

After the receipt of the input data by the master (the block with the designation In3 (6*a*), these can be retrieved by the application software during the next PLC cycle. All of the subsequent PLC cycles receive the same data until the wind farm protocol has new ones. This is indicated by the dashed arrows 8, 8*a*, 8*b* upward to "PLC" nos. 9 and 9*a*.

In the following cycle the entire process is repeated as described above.

Figure 18:
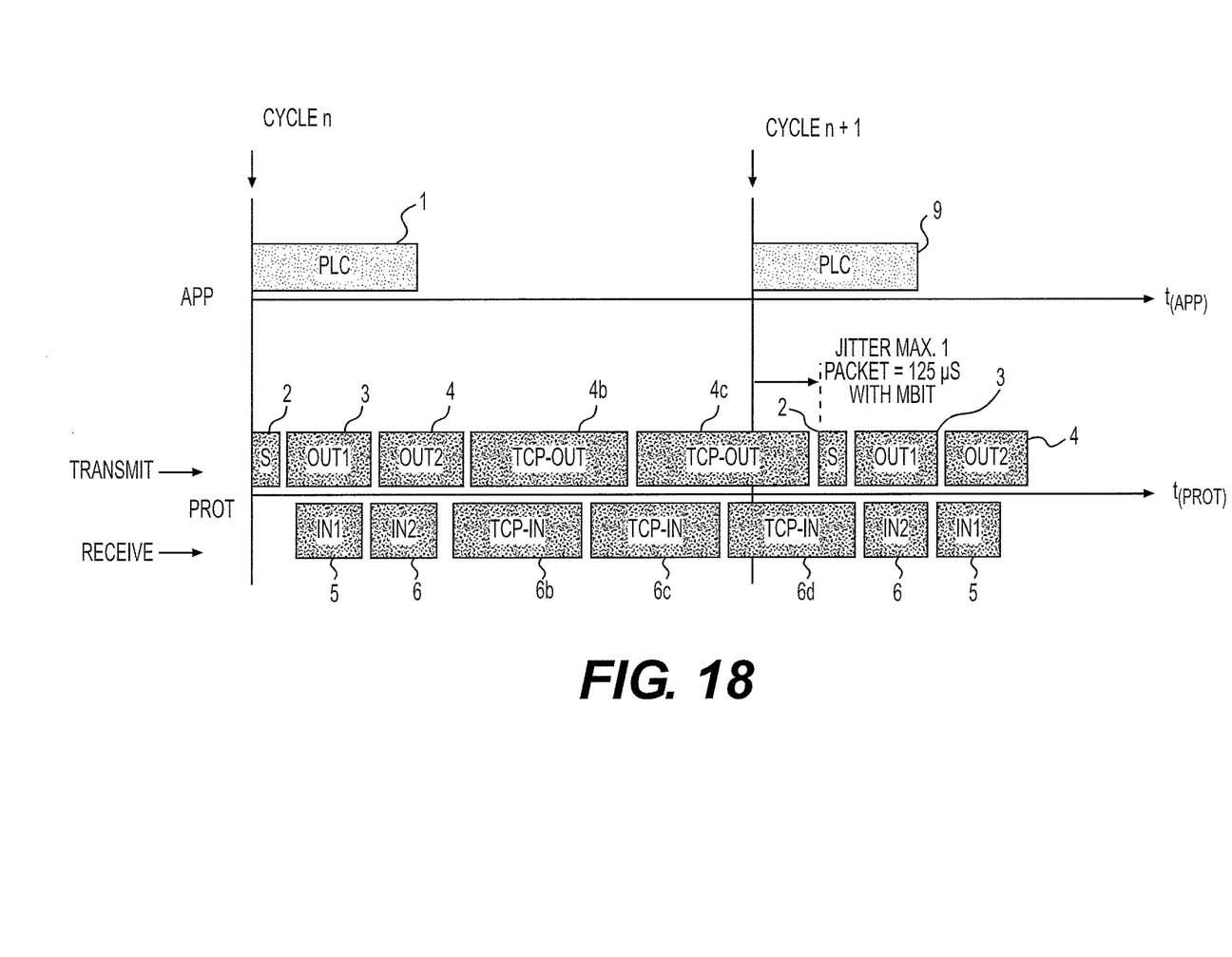
FIG. 18 shows the sequence in the master with TCP/IP data traffic in accordance with an embodiment of the invention.

FIG. 18 discloses the sequence in the master with TCP/IP data traffic as follows:

In this figure, the sequence in the master in synchronous operation is as described in FIG. 17. However, only two slaves per subscribers are listed and in addition TCP/IP data traffic is indicated. The TCP/IP data traffic is possible in addition to the real-time data traffic (wind farm protocol) and is necessary for the exchange of files or other lower ranking communication. This TCP/IP data traffic (blocks TCP-Out 4*b*, 4*c*, and TCP-In 6*b*, 6*c*, 6*d*) can occupy everything that remains in the wind farm protocol after the transmission and receipt of all real time packets.

When an Ethernet packet is in transport, this cannot be broken off. The transport (transmission or reception) of a maximum of one data packet must be completed first. With a 100 Mbit Ethernet, the maximum packet run time is 125 μs. Therefore, in extreme cases a jitter of up to 125 μs in both directions per network connection can occur (master to switch, switch to switch, or switch to slave are respectively one connection). This conduct is illustrated symbolically here for the master graphically.

Actors (see FIG. 1)

| Farm server | |
|---|---|
| Actor | Function |
| Application | Monitors communication to the towers, provides data for SCADA, service, grid station, takes over desired values and commands from the grid control center and transfers them to the farm protocol for transport to the individual wind turbines |
| Application | Calculates desired values and commands for the individual wind turbines from the specifications from the grid control and the grid situation. |

| Wind tower | |
|---|---|
| Actor | Function |
| Application | Handles the entire operation management control, regulation, data acquisition and logging in the wind turbine |

| Grid Control | |
|---|---|
| Actor | Function |
| Application/data interface | Supplies current grid conditions and superordinate desired values for the farm |

| Farm SCADA | |
|---|---|
| Actor | Function |
| Application | Visualizes the farm (operate and observe) Data acquisition/storage Optional: provides (a selection of) data for third parties (operator, shareholder, service centers . . .) |

| Network | |
|---|---|
| Actor | Function |
| Equipment (hardware/firmware/cables) | Transmission line (10/100/1000 Mbit) Switches (more precise classification provided by customer); several cascaded; ring redundancy possible (Spanning Tree) Optical Link Modules (translators of Cu 10/100/1000 to optical waveguide or back); mostly integrated into switches Firewalls (possible) Routers (possible) |

The system specifications of the invention are explained below:

System Specifications

Software Interface

The interfaces to the application software should be simple and performant. The application software can be produced either in "C/C++" or preferably in IEC61131-3. The application writes the content of the outgoing data block or reads the content of the received data block. The coupling of application to the driver of the wind farm protocol is carried out by function. The important thing here is observing data consistency in both directions. If the application reads or changes the data content, the communication may not be carried out at the same time.

The assignment of slaves in the master driver must be simple and always reproducible, regardless of the booting operation.

The above solution for direct handling in the application is the approach for a solution that is performant to a high degree. As a further objective, the possibility should be provided to set up the communication system per configuration without change/recompilation of the applications of the wind turbines. To this end a concept has been developed according to the invention:

- Configuration of the communication by graphic interface (with target and variable browsing) centrally on the farm master.
- Validation of essential framework conditions and consistencies already based on the configuration (for example, does the quantity of data per wind tower×number of wind towers match the cycle time at all).
- Configuration of individual wind turbines or entire groups with uniform data interface.
- Transmission of the communication configuration to all subscribers (wind turbines) via standard Ethernet.
- Adoption of the communication configuration by all subscribers without rebooting the wind turbines.
- Incorporation of the cyclic communication upon initiative of the farm master (measure timing, Init, synchronization, start up . . . ).

The following table shows the stepwise sequence of a communication between master and slave:

| Sequence of main master and slave functions | |
|---|---|
| Function | Description |
| Initialization (start) | Master/slave: start M1 service<br>Master/slave: start tasks;<br>prepare internal data structures; |
| Configuration (evaluation of the configuration or automatic determination) | Master/slave: read in and test configuration |
| Send packets | Master/slave: compile data packets (MAC, type, VLAN, protocol header, data)<br>Master/slave: copy data packets into network buffer and send |
| Receive packets | Master/slave: test data packets → process, discard or forward (for example, TCP)<br>Master/slave: copy data packets from network buffer into slave buffer |
| Synchronization | Master: send sync packets<br>Slave: receive sync packets |
| Connection setup: | Master: establish connection to slave (search, configuration, status)<br>Slave: Answer queries (search, configuration, status) |
| Connection monitoring | Master: Test all slaves for input data<br>Slave: test whether master queries + sync packets arrive in a timely manner |
| Link to the application | Master: Compile application functions (administration, data exchange, diagnosis)<br>Slave: compile application functions (data exchange, diagnosis) |
| Link to the Ethernet controller (forward TCP/IP) | Master/slave: link to lowest layer in the Ethernet driver (raw packets) |
| Error monitoring | Master/slave: network error<br>Master: Network capacity utilization<br>Master: CPU capacity utilization<br>Master: run times of the application |
| Provide statistical data | Master/slave: Diagnosis functions<br>Master/slave: Display as global variables |
| Provide global variables | Master/slave: slave information<br>Master/slave: Error statistics |
| Asynchronous communication functions | Master: BusScan |

What is claimed is:

1. A method for the operation of a wind farm grid system by networking between a farm master and a multiplicity of individual wind turbines (WKA) of a wind farm via a central network for the purpose of data transmission in both directions, the central network having a data transmission protocol comprised of an International Organization for Standardization (OSI model) having a physical layer, an isonet controller layer, a network (IP) layer, a transport (UDP/TCP) layer, a session (RPC) layer, and a wind farm protocol (WPP) application layer, wherein a protocol for networking a multiplicity of wind tower groups with farm master via a central farm network is provided so that the quantity structure of up to 500 wind turbines can be regulated with a cycle time of a few milliseconds via the farm management system, the method comprising:
  transmitting data from the physical layer to the isonet controller layer;
  providing normal TCP/IP communication via the IP, UDP/TCP, and RPC layers between the isonet controller layer and the WPP application layer;
  bridging the IP, UDP/TCP, and RPC layers with a WPP real-time driver;
  transmitting required real-time wind-farm-operation data from the isonet controller layer to the WPP real-time driver; and
  directly transmitting said required real-time wind-farm-operation data from the WPP real-time driver to the WPP application layer.

2. A device for the operation of a wind farm grid system by networking between a farm master and a multiplicity of individual wind turbines (WKA), the device comprising:
  a central international Organization for Standardization (OSI model) network providing data transmission in both directions between the farm master and the wind turbines, the central network having a data transmission protocol comprised of a physical layer, an isonet controller layer, a network (IP) layer, a transport (UDP/TCP) layer, a session (RPC) layer, and a wind farm protocol (WPP) application layer for providing normal TCP/IP communication; and
  WPP real-time driver bridging the IP, UDP/TCP, and RPC layers and directly provide required real-time wind-farm-operation data traffic communication between the isonet controller layer and the WPP application layer, wherein a protocol for networking a multiplicity of wind tower groups with farm master via a central farm network is provided so that the quantity structure of up to 500 wind turbines can be regulated with a cycle time of a few milliseconds via the farm management system.

3. The device recited in claim 2, wherein:
  the central network is configured as a central in line;
  the wind turbines are coupled in selected groups in a plurality of farm ring lines; and
  the WPP application layer carries out data traffic through the WPP real-time driver on the central ring line and on the farm ring lines, to thereby communicate data traffic between the wind turbines and the farm ring line.

4. The device recited in claim 2, wherein for the exchange of files and other lower ranking communication, the TCP/IP data traffic occupies everything that remains in the wind farm protocol after the transmission and receipt of all real-time packets.

5. The device recited in claim 4, wherein a protocol for networking a multiplicity of wind tower groups with farm master via a central farm network is provided so that the quantity structure of up to 500 wind turbines can be regulated with a cycle time of a few milliseconds via the farm management system.

6. The device recited in claim 4, wherein for fulfilling the real-time requirements, the communication is made directly on a data link layer whereas the connection setup and acyclic communication could be carried out via TCP/IP layer.

7. The device recited in claim 4, wherein the real-time packets have higher priority compared with TCP/IP packets.

8. The device recited in claim 4, wherein simultaneous standard TCP/IP communication is performed without influencing the real-time communication.

9. The device recited in claim 2, wherein for fulfilling the real-time requirements, the communication is made directly on a data link layer whereas the connection setup and acyclic communication could be carried out via TCP/IP layer.

10. The device recited in claim 9, wherein the real-time packets have higher priority compared with TCP/IP packets.

11. The device recited in claim 9, wherein simultaneous standard TCP/IP communication is performed without influencing the real-time communication.

12. The device recited in claim 2, wherein the real-time packets have higher priority compared with TCP/IP packets.

13. The device recited in claim 2, wherein simultaneous standard TCP/IP communication is performed without influencing the real-time communication.

14. The device recited in claim 2, wherein for fulfilling the real-time requirements, the communication is made directly on a data link layer whereas the connection setup and acyclic communication could be carried out via TCP/IP layer.

15. The device recited in claim 2, wherein the real-time packets have higher priority compared with TCP/IP packets.

16. The device recited in claim 2, wherein simultaneous standard TCP/IP communication is performed without influencing the real-time communication.

17. A system device for the operation of a wind farm grid system, including by networking between a farm master and a multiplicity of individual wind turbines (WKA), the system device comprising:
- a central International Organization for Standardization (OSI model) network providing data transmission in bath directions between the farm master and the wind turbines, the central network having a data transmission protocol comprised of a physical layer, an isonet controller layer, a network (IP) layer, a transport (UDP/TCP) layer, a session (RPC) layer, and a wind firm protocol (WPP) application layer for providing normal TCP/IP communication, the central network being configured as a central ring line, the wind turbines being coupled in selected groups in a plurality of farm ring lines; and
- a WPP real-time driver bridging the IP, UDP/TCP, and RPC layers and directly provide required real-time wind-farm-operation data traffic communication between the isonet controller layer and the WPP application layer, the WPP application layer carries out data traffic through the WPP real-time driver on the central ring line and on the farm ring lines, to thereby communicate data traffic between the wind turbines and the farm ring line.

18. The device recited in claim 17, wherein a protocol for networking a multiplicity of wind tower groups with farm master via a central farm network is provided so that the quantity structure of up to 500 wind turbines can be regulated with a cycle time of few milliseconds via the farm management system.

19. The device recited in claim 17, wherein for fulfilling the real-time requirements, the communication is made directly on a data link layer whereas the connection setup and acyclic communication could be curried out via TCP/IP layer.

20. The device recited in claim 17, wherein the real-time packets have higher priority compared with TCP/IP packets.

21. The device recited in claim 17, wherein simultaneous standard TCP/IP communication is performed without influencing the real-time communication.

22. A method for the operation of a wind farm grid system including by networking between a farm master and a multiplicity of individual wind turbines (WKA) of a wind farm via a central network fOr the purpose of data transmission in both directions, the central network having a data transmission protocol comprised of an International Organization for Standardization (OSI model) having a physical layer, an isonet controller layer, a network (IP) layer, a transport (UDP/TCP) layer, a session (RPC) layer, and a wind farm protocol (WPP) application layer, the central network being configured as a central ring line, the wind turbines being coupled in selected groups in a plurality of farm ring lines and the WPP application layer carries out data traffic through the WPP real-time driver on the central ring line and on the farm ring lines, to thereby communicate data traffic between the wind turbines and the farm ring line, the method comprising:
- transmitting data from the physical layer to the isonet controller layer;
- providing normal TCP/IP communication via the IP, UDP/TCP, and RPC layers between the isonet controller layer and the WPP application layer;
- bridging the IP, UDP/TCP, and RPC layers with a WPP real-time driver;
- transmitting required real-time wind-farm-operation data from the isonet controller layer to the WPP real-time driver; and
- directly transmitting said required real-time wind-farm-operation data from the WPP real-time driver to the WPP application layer.

* * * * *